United States Patent [19]

Dailey, Jr.

[11] Patent Number: 5,075,414

[45] Date of Patent: Dec. 24, 1991

[54] RESORCINOL-MODIFIED PHENOLIC RESIN BINDER FOR REINFORCED PLASTICS

[75] Inventor: Theodore H. Dailey, Jr., Kittanning

[73] Assignee: Indspec Chemical Corporation, Pittsburgh, Pa.

[21] Appl. No.: 577,807

[22] Filed: Sep. 4, 1990

Related U.S. Application Data

[63] Continuation of Ser. No. 451,988, Dec. 18, 1989, abandoned.

[51] Int. Cl.$^5$ .................. C08G 8/04; C08G 14/02; C08G 8/22
[52] U.S. Cl. .................... 528/129; 528/138; 528/143; 528/155; 528/156; 525/501; 524/13; 524/15; 524/857; 524/876; 428/921; 521/85; 521/103; 521/136; 521/181; 521/907
[58] Field of Search ............... 528/129, 138, 143, 155, 528/156; 525/501; 524/13, 15, 857, 876; 428/921; 521/85, 103, 136, 181, 907

[56] References Cited

U.S. PATENT DOCUMENTS

| | | | |
|---|---|---|---|
| 2,471,631 | 5/1949 | Lebach | 528/129 |
| 3,382,354 | 6/1967 | Dietrick | 528/155 |
| 4,107,127 | 8/1978 | Shia | 528/129 |
| 4,820,576 | 4/1989 | Duryea | 528/155 |

*Primary Examiner*—John Kight, III
*Assistant Examiner*—P. Hampton-Hightower
*Attorney, Agent, or Firm*—Arnold B. Silverman; Craig G. Cochenour

[57] ABSTRACT

A fire resistant resin for use as a binder in reinforced plastics and a resultant reinforced plastic includes the reaction product of (a) at least one resorcinol component selected from the group consisting of resorcinol and resorcinol formaldehyde novolak resin, and (b) a phenolic resole resin. The reaction may be achieved in the presence of an alkaline catalyst.

A method of making a fire resistant resin binder for reinforced plastics and the method of making such reinforced plastics including, (a) at least one resorcinol component selected from the group consisting of resorcinol and resorcinol formaldehyde novolak resin, and (b) a phenolic resole resin. The reaction may be achieved in the presence of an alkaline catalyst.

15 Claims, No Drawings

RESORCINOL-MODIFIED PHENOLIC RESIN BINDER FOR REINFORCED PLASTICS

BACKGROUND OF THE INVENTION

This application is a continuation of 07/451,988 filed 12/18/89, now abandoned.

1. Field of the Invention

This invention relates to a fire resistant resin for use as a binder in reinforced platics and to such reinforced plastics as well as the method of making such resins and plastics.

2. Description of the Prior Art

It has been known to employ reinforced plastic materials such as fiberglass, for example, in a wide variety of environments including building products, transportation uses such as automobiles, planes and boats, as well as many other uses, such as air ducts, panels, doors and electrical conduits. The reinforcing material serves to enhance the strength of the plastic materials and the binders secure the material in the desired positions. A wide variety of reinforcing materials have been employed as reinforcing material. Examples of such materials are carbon fibers, glass fibers and flakes, glass or ceramic microspheres and a wide variety of synthetic materials in various forms including continuous fiber and chopped fiber.

Among the important considerations in resin binders used for such purposes are the desire to have effective resistance to both flame and smoke developement, as well as maintaining the desired mechanical properties at elevated temperatures.

It has been known to employ a condensation product of resorcinol and formaldehyde resins in combination with cement in such resins. See U.S. Pat. No. 3,663,720. See also, U.S. Pat. No. 3,502,610.

Building codes and regulatory agencies specify low smoke density values for such thermosetting and thermoplastic materials that only a limited number of materials can be employed due to economic considerations. Further, increasingly tight restrictions have been imposed on emissions of styrene, a chemical generally deemed necessary in the industry. This is so as styrene is currently under investigation as being a possible carcinogen. While phenolic resins have been suggested as a safe alternative for fire retardant applications, one of impediments to growth of use of such composites is the reluctance of fabricators to have the required acid catalyst present in the shop environment.

A serious problem with most fire-retardant resins is smoke emiisions. It is currently believed that a high percentage of fatalities and fire are caused by smoke inhalation. Most fire retardant reinforced plastics tend to emit dense clouds of toxic and acutely irritating gases. Such smoke and gases can cause death or lung damage as a result of inhalation. They also can obstruct vision, thereby interfering with escape to safety and efforts of fire fighters. Further, damage to facilities including delicate electronic equipment can occur.

Most phenolic laminating resins rely upon acid catalysts or high temperature post-curing or both.

As formaldehyde has recently been classified as a carcinogen, one must carefully evaluate the level of paraformaldehyde disclosed in the prior art. It is important to reduce exposure of the laminating worker to a lower level of formaldehyde emissions.

U.S. Pat. No. 4,403,066 discloses the use of liquid phenol-formaldehyde resoles in reinforced composites such as those reinforced by glass fiber. One of the difficulties with the system taught in this patent is that it requires curing of the resin at an elevated temperature such as at about 80° to 150° C. and that it requires strongly acidic or alkaline conditions. See also, U.S. Pat. No. 4,433,129 which discloses hemi-formals of methylolated phenols including those made by reaction of paraformaldehyde with liquid phenol to produce hemi-formals of methylolated phenols.

U.S. Pat. No. 4,433,119 discloses liquid compositions of a hemi-formal phenol or methylolated phenols with polymers such as phenol-formaldehyde resoles, phenol-formaldehyde, novolak, as well as other materials. See also U.S. Pat. No. 4,430,473.

U.S. Pat. No. 4,053,447 discloses a resorcinol-modified phenolic resin which is said to be curale without the addition of heat. This disclosure requires the addition of paraformaldehyde powder to cure the resin mix.

It has been known to sue resorcinol modified phenolic resins in the manufacture of glue laminated wooden structural members. Adaptation of this technology to reinforced plastics, has had limited success due to the relatively high level of non-reactive solvents formerly necessary to achieve low viscosity in conventional resin systems. The high solvent content of conventional "first generation resins" as well as the water formed in the phenolic condensation reaction contribute to crazing, porosity and poor corrosion resistance experienced in earlier resin systems.

In spite of the known prior art system, there remains a very real and substantial need for resin binder for reinforced plastics which will have the desired flame and smoke development resistant characteristics while being curable at room temperature and easy to manufacture and use.

SUMMARY OF THE INVENTION

The present invention has met the above-described needs.

In the present invention, a fire resistant resin for use as a binder in reinforced plastics such as thermosetting plastics, is obtained from the reaction product of (a) at least one resorcinol component selected from the group consisting of resorcinol and resorcinol formaldehyde novolak resin, and (b) a phenolic resole resin with said reaction preferably but not necessarily being achieved in the presence of an alkaline catalyst. The resin is curable at a temperature of about 16° to 160° C. in about 20 to 0.06 hours, which will generally be at about 55° to 95° F. with a room temperature cure for about 8 to 14 hours being most advantageous.

In addition, a methylene donor may be employed in the reaction so as to improve processing and wet out of the reinforcing material and increasing the cross-density thereby providing additional strength to the reinforced plastic.

It is an object of the present invention to provide an improved phenolic resin which is usable as a binder in reinforced plastics and which has excellent resistance to flame development and extremely low smoke development as well as excellent high temperature mechanical strength.

It is a further object of the present invention to provide such a resin which is curable at room temperature within a reasonable time.

It is a further object of the present invention to provide such a resin which eliminates the need to use paraformaldehyde as a curing agent and thereby retains less water and other volatile solvents which can contribute to weakening of the composite plastic material, and reduces formaldehyde exposure.

It is a further object of the present invention to provide such a phenolic resin which has higher solids content and superior strength.

It is a further object of the present invention to provide such a resin which cures at an intermediate pH as well as with an acidic catalyst, if desired.

It is a further object of the present invention to provide such a resin which when exposed to flame not only facilitates lower level flame spread without requiring additives and lower levels of smoke emission, but provides less toxic smoke emissions.

It is a further object of the present invention, to provide such resins in reinforced plastics which possess improved tensile and flexural properties.

It is a further object of the present invention to provide such a resin which avoids the requirement that there be a strongly acidic or strongly alkaline condition for curing and thereby avoids this source of potential damage to the reinforcing material.

It is a further object of the present invention to provide such a resin which does not contain any solvents which would damage the reinforcing material.

These and other objects of the present invention will be more fully understood from the following description of the invention.

DESCRIPTION OF THE PREFERRED EMBODIMENTS

The resin of the present invention is adapted to serve as an effective binder in reinforced plastics. The resin is a two part liquid-liquid pre-catalyzed system to which inert filler may be added as an extender, if desired. The filler, however, need not be employed in order to achieve the fire and smoke emission properties. The higher solids content does provide superior chemical resistance and lower porosity. Under the influence of flame contact or radiant heat, it resists flame and smoke developement. The resin is preferably a reaction product of (a) at least one resorcinol component selected from the group consisting of resorcinol and resorcinol formaldehyde novolak resin, and (b) a phenolic resole resin with said reaction preferably but not necessarily being achieved in the presence of an alkaline catalyst.

A further advantage of the resin of the present invention over the acid-catalyzed phenolic resins is that it will not corrode tooling and yet is not so alkaline as to damage the glass mat.

One of the advantages of the resin is that it is curable to release at room temperature within a reasonable time period. In general, it may be cured at about 16 to 160° C. in about 20 to 0.06 hours. It will cure in a moderate pH on the order of about 6 to 10.

The resorcinol component may consist of about 32 to 80 weight percent resorcinol and preferably about 58 to 71 and about 5 to 12 weight percent formaldehyde with about 5 to 11 weight percent being preferred. The resorcinol component may also have about 0.025 to 0.25 weight percent and preferably about 0.03 to 0.07 weight percent of an organic acid solution such as p-toluene sulfonic acid or oxalic acid, for example, in order to adjust the pH, or as a catalyst.

The phenolic resole has about 40 to 71 weight percent phenol an preferably about 55 to 67 percent and about 20 to 52 percent paraformaldehyde and preferably about 35 to 43 percent.

One of the difficulties of the use of paraformaldehyde in the prior art systems was the use of powder caused increased exposure of plant personnel to this potentially dangerous material. Among the advantages of the present invention are the faster reacting time as the paraformaldehyde must dissolve and at least partially dissociate into formaldehyde molecules before reaction with the phenolic. Also the present system is easier to use as the hardening agent is in liquid form and requires less mixing. Further, the present system produces a better product as no solvent is required to dissolve the paraformaldehyde in order that it can react.

The alkaline catalyst may be any suitable catalyst. It may be selected from the group consisting of metallic hydroxides and metallic oxides and amines such as sodium hydroxide, ammonium hydroxide and potassium hydroxide, for example.

In a preferred practice of the invention a further methylene donor is added in order to reduce the mix fiscosity and thereby improve processing and wet out of the reinforcing material. It also serves to increase the cross-link density thereby providing added strength to the reinforced plastic. About 0.01 to 40 weight percent (based upon weight of the resin mix) and preferably about 12 to 21 weight percent of the aldehyde may be added to the reaction mix. The methylene donor may be any suitable methylene donor. Among the preferred materials are those selected from the group consisting of furfural, furfuryl alcohol, oxazolidine and acrolein as well as combinations thereof.

Inmaking a reinforced plastic, the resin binder may be mixed with the plastic material such as a glass fiber reinforced plastic, e.g., fiberglass in a conventional manner. The mixture may then be cured at room temperature for about 12 to 24 hours in order to achieve the desired bond between fibers and the plastic.

It will be appreciated that the method of making the fire resistant resin of the present invention involves reacting (a) at least one resorcinol component selected from the group consisting of resorcinol and resorcinol formaldehyde novolak resin, and (b) and phenolic resole resin. The reaction may advantageously be effected in the presence of an alkaline catalyst and at room temperature.

In employing the method to reinforce a plastic, the plastic material is intimately admixed with the binder and then may be cured with the addition of heat if desired to accelerate the action but may advantageously be cured at room temperature.

In order to verify the technical characteristics of the invention, a series of tests were performed. These tests are reported in the following examples.

In Examples 1 through 5, the resole component was made and in Examples 6 through 11, the resorcinol component was made. Examples 12 through 19 recite performance of the reaction and the properties of the resulting materials.

EXAMPLE 1

In this test 418.3 grams of a 90 percent solution of USP phenol, 3.7 grams of zinc acetate dihydrate and 485.6 grams of 37 percent formaldehyde solution were added to reaction flask equipped with a stirrer, a condenser and a heating mantle. The reaction mass was heated to 85° C. and a Dean Starke separator was connected to the condenser. 50.0 grams of cyclohexane were added to the flask. Temperature was adjusted to 72°-73° C. and the reaction mass was refluxed, separating the water azeotropically. 347 grams of water were collected and the cyclohexane was distilled off under vacuum. The resin was cooled to room temperature and decanted.

EXAMPLE 2

This test involved 1882.2 grams of a 90 percent solution of USP phenol, 1187.8 grams of 91 percent paraformaldehyde and 16.9 grams of zinc acetate dihydrate being added to a reaction flask equipped with a stirrer, a condenser and a heating mantle. The reaction mass was heated to 85° C. and maintained until a Gardner-Holdt bubble viscosity of Q-R was obtained. The resin was dehydrated under vacuum to 90°0 C., cooled to room temperature and decanted.

EXAMPLE 3

In this test 658.8 grams of USP phenol were charged to a reaction flask equipped with a stirrer, a condenser and a heating mantle. 34.3 grams of 90 percent paraformaldehyde and 13.1 grams of a 45 percent solution of potassium hydroxide were added. The reaction mass was heated to 80° C. and maintained at that temperature. 308.4 grams of 91 percent paraformaldehyde were added in 9 increments over a two-hour period. The resin was held at 80° C. until a Gardner-Holdt bubble viscosity of 19.3 seconds at 23.0°0 C. was reached, then neutralized with 22.3 grams of a 75 percent solution of toluene-xylene sulfonic acid. 2.0 grams of 45 percent potassium hydroxide were added to adjust pH. The resin was cooled to room temperature and decanted.

EXAMPLE 4

In this test 76.2 pounds of a 90 percent solution of USP phenol were added to a reactor equipped with a stirrer, heating/cooling coil and condenser. 0.68 pounds of zinc acetate dihydrate and 48.1 pounds of 91% paraformaldehyde were added with mixing. The reaction mass was heated to 85° C. and temperature was maintained at that point until a Gardner-Holdt bubble viscosity of "P" was obtained. The resin was then dehydrated under vacuum, cooled to room temperature and 45 pounds were discharged. 19.2 pounds of furfural were mixed into the remainder and discharged.

EXAMPLE 5

This test involved 76.2 pounds of a 90% solution of USP phenol were added to a reactor equipped with a stirrer, a heating/cooling coil and a condenser. 0.68 pounds of zinc acetate dihydrate and 48.1 pounds of 91 percent paraformaldehyde being added while stirring. The reaction mass was heated to 85° C. and held at that temperature until a Gardner-Holdt bubble viscosity of I-J was reached. The resin was dehydrated under vacuum to an endpoint viscosity of 30-50 seconds (Gardner-Holdt), cooled to room temperature and discharged.

EXAMPLE 6

In this test 1982.0 grams of Resorcinol, Technical Flake, were added to a reaction flask equipped with a stirrer, a condenser and a heating mantle. 550 g. of de-ionized water and 131.1 grams of 37 percent formaldehyde were added to the flask. Heat was applied to 65° C. and an exotherm resulted. 305.9 grams of 37 percent formaldehyde were added streamwise after the exotherm had subsided. 5.4 grams of a 50 percent solution of oxalic acid were added and the reaction mass temperature was held above 100° C. for one-half hour. The resin was dehydrated at atmospheric pressure and then under vacuum to a temperature of 165° C., then 427.1 grams of de-ionized water were added. The resin was cooled to room temperature and decanted.

EXAMPLE 7

In this test 85.7 pounds of Resorcinol, Technical Flake, were charged to a reaction vessel equipped with a stirrer, a heating/cooling coil, and a condenser. 21.4 pounds of deionized water were added. 5.7 pounds of 37 percent formaldehyde solution were added and heat was added until a temperature of 100° C. was reached. The reaction mass was stirred after the resorcinol dissolved. 13.2 pounds of 37 percent formaldehyde were added over a one-half hour period. 0.5 pound of 50 percent oxalic acid solution was added and the reaction mass was held above 100° C. for one-half hour. The resin was dehydrated at atmospheric pressure. Then under vacuum to 150° C., then 18.1 pounds of water were added. The resin was cooled to room temperature and discharged.

EXAMPLE 8

This test involved 1982 grams of Resorcinol, Technical Flake being charged to a reaction vessel equipped with a stirrer, heating mantle and a condenser. 495.5 grams of distilled water and 218.5 grams of 37 percent formaldehyde solution were added and mixed. Heat was applied until a temperature of 75° C. was reached, then the reaction exotherm caused the temperature to rise to 90° C. When peak temperature was reached, 509.9 grams of 37 percent formaldehyde solution was added slowly over a 1 ½ hour period. Next, 18.4 grams of 50 percent oxalic acid solution in water were added. Temperature wa held above 100° C. for one hour. The resin was heated and dehydrated atmospheric pressure, then under vacuum to a temperature of 165° C. 852 grams of distilled water and 1321.3 grams of resorcinol were added to the reaction flask and mixed for one hour. The resin was cooled to room temperature and discharged.

EXAMPLE 9

In this test 192 grams of Resorcinol, Technical Flake was charged to a glass reaction vessel equipped with a stirrer, condenser and heating mangle. The resorcinol was melted and 13.6 grams of a 20 percent solution of p-toluene sulfonic acid was added while mixing. 728.4 grams of a 37 percent formaldehyde solution were added streamwise. The reaction mass was held above 100° C. for one hour after the formaldehyde addition was complete, then 321.3 grams of resorcinol were added. The reaction mix was heated to dissolve the resorcinol and held for 1 hour above 100° C. 161.8 grams of 50 percent sodium hydroxide were added. The resin was cooled to room temperature and discharged.

EXAMPLE 10

In this test 56.5 pounds of Resorcinol, Technical Flake, were charged to a steel reactor equipped with a heating/cooling coil, a stirrer and a condenser. The resorcinol was melted and 0.4 pound of a 20 weight percent water solution of p-toluene sulfonic acid was added to the reactor while stirring. 20.8 pounds of a 37 percent formaldehyde solution were added streamwise to the reactor over a 1 ½ hour period. The reaction mass was held at 100°-110° C. for one hour with mixing, then 37.7 pounds of Resorcinol, Technical Flake, were added to the vessel. Temperature was maintained at 80°-100° C. for a ½ hour mixing period, then 5.8 pounds of a 50 percent solution of sodium hydroxide were added. The resin was cooled to room temperature and discharged.

EXAMPLE 11

This test involved 1101.1 grams of Resorcinol, Technical Flake being added to a reaction flask equipped with a stirrer, a condenser and a heating mantle. The resorcinol was heated to melting and 814 grams of a 20 percent p-toluene sulfonic acid solution were added. 404.6 grams of 37 percent formaldehyde solution were added streamwise over a 45-minute period and the reaction mass was maintained above 100° C. for one hour. 734.2 grams of Resorcinol, Technical Flake, were added and mixed at 80°-100° C. for one-half hour. 112.0 grams of 50 percent sodium hydroxide were added and mixed. The resin was cooled and decanted. To one increment, designated 11A, 5 parts per hundred resin (phr) of acetone were added. To a second increment, designated as 11B, 5 phr or methanol were added. A third increment was not modified.

EXAMPLE 12

Resins for Examples 2 and 6 were mixed with filler, solvents and bonding agents as per the table below and applied to chopped strand mat (which is marketed by PPG Industries of Pittsburgh, Pa. under the trade designation PPG AKM) using hand layup techniques. Example 12A was heated in a press at 85° C. for 10 minutes. Example 12B was maintained at room temperature. Mechanical properties were tested as per applicable ASTM procedures. Glass content was approximately 25 weight percent. Results are listed below.

|  | Weight Percent | |
|---|---|---|
|  | A | B |
| Resin 2 | 36.2 | 36.2 |
| Furfural | 12.7 | 12.7 |
| Resin 6 | 30.0 | 30.0 |
| Mg(OH)$_2$ | 2.9 | 2.9 |
| ATH | 15.8 | 15.8 |
| Aminosilane | 2.4 | 2.4 |
| NaOH | 1.0 | 1.0 |
| Tensile Strength, psi | 10,816 | 11,364 |
| Tensile Modulus, psi | 754,220 | 779,240 |
| Flexural Strength, psi | 22,998 | 21,859 |
| Flexural Modulus, psi | 819,610 | 800,090 |

This Example shows a phenolic component at about 60 percent phenol and 42 percent formaldehyde along with a resorcinol novolak at 77 percent resorcinol and 17 percent formaldehyde use to make the reinforced plastic laminate. The results indicate good mechanical properties for the laminates. The result also show that the properties were generally the same whether the material was cured at room temperature or was heated to accelerate the cure.

EXAMPLE 13

Resins from Examples 4 and 7 were mixed with filler, solvents, catalysts and bonding promoters as per the previous example and applied to PPG AKM chopped strand mat using hand layup techniques. Glass content was approximately 25 weight percent. The amount of furfural and resin (7) was varied but the total ratio of methylene donor and acceptor was maintained. Mechanical properties were obtained with applicable ASTM test methods and are listed below.

|  | A | B | C | D | E |
|---|---|---|---|---|---|
| Furfural Content, phr | 20 | 30 | 35 | 40 | 50 |
| Tensile Strength, psi $\times$ 10$^3$ | 10.7 | 11.7 | 9.4 | 12.2 | 10.7 |
| Tensile Modulus, psi $\times$ 10$^6$ | 0.76 | 0.79 | 0.61 | 0.85 | 0.71 |
| Flexural Strength, psi $\times$ 10$^3$ | 21.0 | 23.1 | 20.7 | 25.6 | 23.8 |
| Flexural Modulus, psi $\times$ 10$^6$ | 0.75 | 0.85 | 0.79 | 0.89 | 0.86 |

This Example illustrates a phenolic component at about 61 percent phenol and 38.5 percent formaldehyde. Furfural ratios were varied from 25 to 50 parts per 100 parts of the phenolic component. The resorcinol novolak was 79 percent resorcinol and 17.5 percent formaldehyde. This test showed good results with varied amounts of furfural and resorcinol novolak component.

EXAMPLE 14

Resins from Examples 4 and 7 were mixed with various fillers, solvents, catalysts and bonding promoters in the ratio from Example 11 and applied to PPG AKM chopped strand mat using hand layup techniques (glass content is approximately 25 weight percent). Samples were cured at room temperatures and testing using applicable ASTM procedures. Mechanical properties are listed below.

|  | A | B | C | D |
|---|---|---|---|---|
| Filler | ATH | None | Talc | Kaolin |
| Tensile Strength, psi $\times$ 10$^3$ | 13.1 | 11.0 | 10.9 | 9.6 |
| Tensile Modulus, psi $\times$ 10$^6$ | 0.94 | 0.78 | 0.79 | 0.62 |
| Flexural Strength psi $\times$ 10$^3$ | 22.7 | 21.6 | 19.9 | 23.8 |
| Flexural Modulus, psi $\times$ 10$^6$ | 0.73 | 0.67 | 0.67 | 0.92 |

These tests illustrate examples of several different fillers i.e. ATH (hydrated alumina), kaolin (China clay) and talc or no filler can be satisfactorily employed in making laminates of the present invention.

EXAMPLE 15

Resins from Examples 3 and 8 were mixed with solvents, fillers, catalysts and bonding promoters as in earlier examples and applied to PPG AKM chopped strand mat at an approximate glass content of 25 weight percent. Hand layup techniques were used and the samples were allow to cure at room temperature. Mechanical testing was performed following applicable ASTM procedures. Results are listed below.

|  | Weight Percent |
|---|---|
| Resin 3 | 41.5 |
| Furfural | 16.6 |
| Resin 8 | 20.5 |
| Mg(OH)$_2$ | 3.3 |
| ATH | 15.7 |
| Aminosilane | 2.4 |
| NaOH | 1.0 |
| Tensile Strength, psi $\times$ 10$^3$ | 8.6 |

|  | Weight Percent |
|---|---|
| Tensile Modulus, psi × $10^6$ | 0.81 |
| Flexural Strength, psi × $10^3$ | 17.4 |
| Flexural Modulus, psi × $10^6$ | 0.70 |

This Example illustrates the activation and cure of a conventional phenolic resole (non-Bender catalyzed) containing about 63.5 percent phenol and 33 percent formaldehyde by addition of a recorsinol novolak containing about 74.3 percent resorcinol and 16.4 percent formaldehyde along with the addition of an aldehyde source, furfural, to make a laminate with reasonably satisfactory mechanical properties when cured at room temperature. These tests demonstrate that the use of resorcinol or a resorcinol novolak has broader applications than the specific type of resole resin employed in the other examples.

EXAMPLE 16

A resole resin commercially available from Koppers Company, Inc., of Pittsburgh, Pa., under the trade designation B-505-10, and a resin from Example 8 were mixed with solvents, fillers, catalysts and bonding promoters and applied using hand layup techniques to PPG AKM chopped strand mat at a glass content of approximately 25 weight percent. Mechanical properties were evaluated using applicable ASTM test procedures and are listed below.

|  | Weight Percent | |
|---|---|---|
|  | A | B |
| Resole | 34.6 | 33.9 |
| Furfural | 13.8 | 13.5 |
| Resin 8 | 29.7 | 29.1 |
| Mg(OH)$_2$ | 2.8 | 2.7 |
| ATH | 15.8 | 15.4 |
| Aminosilane | 2.1 | 2.1 |
| NaOH | 1.0 | 2.9 |
| Tensile Strength, psi × $10^3$ | 10.6 | 8.6 |
| Tensile Modulus, psi × $10^6$ | 0.84 | 0.87 |
| Flexural Strength, psi × $10^3$ | 18.0 | 16.3 |
| Flexural Modulus, psi × $10^6$ | 0.64 | 0.63 |
| NBS Smoke Chamber | | |
| D max. Flaming Mode | 37 | — |
| Smoldering Mode | 15 | — |

The tests of Example 16 were very similar in objective to those of Example 15. A different resole, i.e., Koppers phenolic foam resole available under the trade designation B-505-10 was cured by the addition of a resorcinol novolak and a methylene donor, furfural under mildly alkaline conditions to produce a satisfactory laminate at room temperature.

EXAMPLE 17

Resins for Examples 5 and 11 were mixed with solvents, fillers, catalysts and bonding promoters and applied to PPG AKM chopped strand mat using hand layup technique. Glass content was approximately 25 weight percent. Mechanical results were obtained using applicable ASTM test methods and are listed below.

|  | Weight Percent | | |
|---|---|---|---|
|  | A | B | C |
| Resin 5 | 34.2 | 34.6 | 34.6 |
| Resin | (11) | (11A) | (11B) |
| Level | 30.6 | 29.9 | 29.9 |
| Furfural | 13.7 | 13.9 | 13.9 |
| Mg(OH)$_2$ | 2.7 | 2.7 | 2.7 |
| ATH | 15.7 | 15.7 | 15.7 |
| Aminosilane | 2.4 | 2.4 | 2.4 |
| NaOH | 1.0 | 1.0 | 1.0 |
| Tensile Strength, psi × $10^3$ | 13.3 | 10.8 | 10.6 |
| Tensile Modulus, psi × $10^6$ | 0.99 | 0.73 | 0.78 |
| Flexural Strength, psi × $10^3$ | 20.0 | 16.7 | 19.1 |
| Flexural Modulus, psi × $10^6$ | 0.68 | 0.60 | 0.64 |
| Limiting Oxygen Index | 54 | 48 | 49 |
| NBS Smoke Chamber | | | |
| D max. Flaming Mode | 28 | 12 | 17 |
| Smoldering Mode | 9 | 5 | 8 |

This Example establishes that satisfactory laminates may be made with recorsinol novolaks diluted with solvents to improve processability without having a negative effect on smoke emissions. A resole with phenol furfural and formaldehyde in the preferred range and a resorcinol novolak in the preferred ranges were employed.

EXAMPLE 18

Resins from Examples 5 and 10 were mixed with fillers, solvents, catalysts and bonding promoters and applied using hand layup techniques to a variety of chopped strand mats as listed below. Glass content was approximately 35 weight percent. Mechanical testing was done following applicable ASTM procedures. Results are listed below.

| Glass Manufacturer | Owens Corning | Owens Corning | Certainteed | Scandinavian | Owens Corning |
|---|---|---|---|---|---|
| Type | M902x23A | M-710 | M-127 | MK10B | M-711 |
| Tensile St., psi × $10^3$ | 14.2 | 14.4 | 14.9 | 14.4 | 13.1 |
| Tensile Mod., psi × $10^6$ | 0.72 | 0.99 | 0.86 | 0.81 | 0.84 |
| Flexural St., psi × $10^3$ | 32.3 | 30.4 | 31.0 | 26.8 | 29.4 |
| Flexural Mod., psi × $10^6$ | 1.15 | 1.09 | 1.11 | 0.99 | 0.97 |

These tests show that the invention was effective in the preferred ranges with a variety of brands of fiberglass reinforcement.

EXAMPLE 19

Resins from Examples 5 and 10 were mixed with solvents, fillers, catalysts and bonding promoters and applied to Certainteed M-127 ® chopped strand mat, faced with C-glass veil, using hand layup techniques. Glass content was approximately 35 weight percent. Mechanical properties were evaluated by applicable ASTM test procedures and are listed below. Fillers were added at 12.5 and 20 weight percent levels.

|   | A | B |
| --- | --- | --- |
| Filler, weight percent | 12.5 | 20.0 |
| Tensile Strength, psi × $10^3$ | 16.5 | 17.6 |
| Tensile Modulus, psi × $10^6$ | 0.95 | 1.39 |
| Flexural Strength, psi × $10^3$ | 25.8 | 24.9 |
| Flexural Modulus, psi × $10^6$ | 1.18 | 1.13 |
| D max. Flaming Mode | 22 | 17 |

Example 19 shows laminates using the preferred ratio of components and two levels of a different filler i.e. barium sulfate as well as a different type of veil. This illustrates a well the numerous areas of potential improvements over the prior art with minor modifications which one skilled in the art may employ.

It will be appreciated that desired additional ingredients may be employed in the resin and resultant composite plastic of the present invention if desired. For example, fillers, if desired, such as wood flower, barium sulfate, hydrated alumina, silicates, kaolin, talc, walnut shell flower, glass beads, ceramic and, for example, carbon may be employed in a manner known to those skilled in the art. While such fillers may be employed in order to reduce costs and contribute to dimensional stability, they are not needed to provide flame and smoke retardation. In addition, should it be desired, pigments may be employed. Accelerators and other additives known to those skilled in the art may be employed.

While for simplicity of disclosure herein, reference has been to fiberglass as the reinforced plastic, it will be appreciated that other reinforced plastics whether or not reinforced by glass or synthetic fibers may be used beneficially with the resinous binder of the present invention. Included in such materials are polyvinyl choloride polyethylene, polypropylene, polyester urethane and epoxies.

It will be appreciated, therefor, that the present invention provides an efficient resinous binder and method of using the same inc reacting reinforced plastics having improved properties. All of the is is accomplished in a simple and economical manner which permits the use of room temperature curing and has the desired flame and smoke resisting characteristics. All of this is done in such a manner as to eliminate the disadvantageous characteristics of the use of paraformaldehyde as a curing agent.

It will be appreciated that the resins and reinforced plastics of the present invention are usable in a wide range of environments where reinforced plastics are employed.

While the invention facilitates the advantageous use of alkaline catalysts, the invention is not so limited. If desired, for example, acid catalysts may be used.

Whereas particular embodiments of the invention have been described above for purposes of illustration, it will be appreciated by those skilled in the art that numerous variations of the details may be made without departing from the invention as described in the appended claims.

I claim:

1. A method of making a fire resistant resin binder comprising reacting
    (a) at least one recorsinol component selected from the group consisting of resorcinol and resorcinol formaldehyde novolak resin, wherein said resorcinol formaldehyde novolak resin comprises the reaction product of an aldehyde and resorcinol in the presence of an acidic catalyst, and
    (b) a phenolic resole resin comprising the reaction product of a phenol and either formaldehyde or paraformaldehyde, wherein said paraformaldehyde first dissolves and at least partially dissociates into formaldehyde before reacting with said phenol.

2. The method of claim 1 including effecting said reaction between said recorsinol component and said phenolic resole resin in the presence of an alkaline catalyst.

3. The method of claim 2 including
    effecting said reaction at a temperature of about 16° to 160° for about 20 to 0.06 hours.

4. The method of claim 3 including
    effecting said reaction at room temperature.

5. The method of making a fire retardant resin binder of claim 4 including
    said binder having a pH of about 6 to 10.

6. The method of making a fire retardant resin binder of claim 5 including
    reducing the viscosity of said resin mix by means of a methylene donor.

7. The method of making a fire retardant resin binder of claim 6 including
    employing about 0.01 to 40 weight percent based on weight of the resin mix of said methylene donor in said reaction.

8. The method of making a fire retardant resin binder of claim 5 including
    employing said resorcinol component having about 58 to 71 weight percent of the resin mix resorcinol and about 5 to 12 weight percent formaldehyde.

9. The method of making a fire retardant resin binder of claim 8 including
    employing about 0.025 to 0.25 weight percent of said acidic catalyst in said resorcinol component.

10. The method of making a fire retardant resin binder of claim 8 including
    employing said phenolic resole about 55 to 67 weight percent phenol and about 35 to 43 weight percent peraformaldehyde.

11. The method of making a fire retardant resin binder of claim 9 including
    employing as said alkaline catalyst materials selected from the group consisting of sodium hydroxide, ammonium hydroxide and amines.

12. The method of making a fire retardant resin binder of claim 6 including
    employing as said methylene donor a material selected from the group consisting furfural, furfuryl alcohol, oxazolidine, acrolein and combinations thereof.

13. A method of making a fire resistant reinforced plastic article comprising
    admixing a reinforcing material with a resin which is the reaction product of:
    (a) at least one resorcinol component selected from the group consisting of resorcinol and resorcinol formaldehyde novolak resin, wherein said resorcinol formaldehyde novolak resin comprises the reaction product of an aldehyde and resorcinol in the presence of an acidic catalyst; and
    (b) a phenolic resole resin comprising the reaction product of a phenol and either formaldehyde or paraformaldehyde, wherein said paraformaldehyde first dissolves and at least partially dissociates into formaldehyde before reacting with said phenol, and curing to release said admixture at a temperature of about 16° to 160° C. for about 20 to 0.06 hours.

14. The method of claim 13 including effecting said reaction between said resorcinol component and said phenolic resole resin in the presence of an alkaline catalyst.

15. The method of claim 13 including, employing fiberglass as the reinforcement material.

* * * * *

UNITED STATES PATENT AND TRADEMARK OFFICE
CERTIFICATE OF CORRECTION

PATENT NO. : 5,075,414
DATED : December 24, 1991
INVENTOR(S) : Dailey, Jr.

It is certified that error appears in the above-identified patent and that said Letters Patent is hereby corrected as shown below:

Column 1, line 10, "platics" should read -- plastics --.

Column 1, line 47, -- the -- should be inserted before "impediments".

Column 1, line 51, "emiisions" should be -- emissions --.

Column 2, line 16, "curale" should read -- curable --.

Column 2, line 19, "sue" should be -- use --.

Column 3, line 68, "an" should read -- and --.

Column 4, line 22, "fiscosity" should read -- viscosity --.

Column 4, line 43, "and" (second occurrence) should read -- a --.

UNITED STATES PATENT AND TRADEMARK OFFICE
CERTIFICATE OF CORRECTION

PATENT NO. : 5,075,414
DATED : December 24, 1991
INVENTOR(S) : Dailey, Jr.

It is certified that error appears in the above-identified patent and that said Letters Patent is hereby corrected as shown below:

Column 4, line 65, -- a -- should be added before "reaction".

Column 5, line 16, "90°0C" should read -- 90°C --.

Column 5, line 29, "23.0°0" should read -- 23.0° --.

Column 6, line 37, -- a -- should be added before "50".

Column 6, line 38, "wa" should read -- was --.

Column 6, line 39, -- at -- should be inserted before "atmospheric".

Column 6, line 47, "192" should read -- 1982 --.

Column 7, line 15, -- a -- should be inserted before "37".

UNITED STATES PATENT AND TRADEMARK OFFICE
CERTIFICATE OF CORRECTION

PATENT NO. : 5,075,414
DATED : December 24, 1991
INVENTOR(S) : Dailey, Jr.

It is certified that error appears in the above-identified patent and that said Letters Patent is hereby corrected as shown below:

Column 7, line 56, "use" should read -- used --.

Column 8, line 57, "allow" should read -- allowed --.

Column 10, line 31, -- , -- should be inserted before "furfural".

Column 11, line 13, "a" should read -- as --.

Column 11, line 40, "inc reacting" should read -- in creating --.

Column 11, line 41, "the is" should read -- this --.

Claim 1, column 11, line 65 and Claim 2, column 12, line 9, "recorsinol" and "recorcinol" should read -- resorcinol --.

UNITED STATES PATENT AND TRADEMARK OFFICE
CERTIFICATE OF CORRECTION

PATENT NO. : 5,075,414
DATED : December 24, 1991
INVENTOR(S) : Dailey, Jr.

It is certified that error appears in the above-identified patent and that said Letters Patent is hereby corrected as shown below:

Claim 10, column 12, line 41, -- in --. should be inserted before "said".

Claim 10, column 12, line 43, "peraformaldehyde" should read -- paraformaldehyde --.

Signed and Sealed this

Second Day of May, 1995

Attest:

BRUCE LEHMAN

Attesting Officer     Commissioner of Patents and Trademarks